(12) United States Patent
Slane

(10) Patent No.: US 6,567,790 B1
(45) Date of Patent: May 20, 2003

(54) ESTABLISHING AND MANAGING GRANTOR RETAINED ANNUITY TRUSTS FUNDED BY NONQUALIFIED STOCK OPTIONS

(75) Inventor: Robert C. Slane, Maitland, FL (US)

(73) Assignee: Wealth Transfer Group, L.L.C., Altamont Springs, FL (US)

( * ) Notice: Subject to any disclaimer, the term of this patent is extended or adjusted under 35 U.S.C. 154(b) by 0 days.

(21) Appl. No.: 09/453,364

(22) Filed: Dec. 1, 1999

(51) Int. Cl.[7] .............................................. G06F 17/60

(52) U.S. Cl. ...................................................... 705/36

(58) Field of Search .............................. 705/36, 35, 37

(56) References Cited

U.S. PATENT DOCUMENTS 6,058,377 A * 5/2000 Traub et al. .................. 705/36

FOREIGN PATENT DOCUMENTS

JP          2002-24533 A  *  1/2002

OTHER PUBLICATIONS

Newlin, Charles F. and Andrey, Gwendolyn S., "STructuring GRATs Under the Section 7520 Regulations", Estate Planning, 24 Est. Plan. 156 (May 1997).*

IRS Letter Ruling 9248016; 92 TNT 238–44 (Nov. 30, 1992).*

Franz, D.R., "How to Value Gifts of Employee Stock Options," The Tax Advisor, Dec. 1998, pp. 848–855.

Harrison, L.S., "Using Options to Allow Donees to Have the Donor's Cake and Eat It, Too," Taxes, Mar. 1999, pp. 277–286.

Renninger, M.K., "Company Stock Option Plans," Personal Financial Planning, Jan./Feb. 1999, pp. 47–57.

Renninger, M.K., "How and When to Exercise Options," Personal Financial Planning, Mar./Apr. 1999, pp. 51–62.

American Jurisprudence, Second Edition, vol. 34A (1999 Edition), Federal Taxation ¶¶ 143,001–183,320, pp. 896–902.

Estate Planning & Taxation Coordinator, Grantor Retained Annuity Trust (GRAT), ¶ 39,141, Sep. 7, 1999.

Title 26—Internal Revenue Code, Subtitle A, Chapter 1, Subchapter P, Part V, Subpart A, Sec. 1274, Jan. 26, 1998.

(List continued on next page.)

*Primary Examiner*—Robert P. Olszewski
*Assistant Examiner*—Andrew J. Fischer
(74) *Attorney, Agent, or Firm*—Moore & Van Allen PLLC; Matthew W. Witsil; Dominic J. Chiantera

(57) ABSTRACT

An estate planning method for minimizing transfer tax liability with respect to the transfer of the value of stock options from a holder of stock options to a family member of the holder. The method comprises establishing a Grantor Retained Annuity Trust (GRAT) funded with nonqualified stock options. The method maximizes the transfer of wealth from the grantor of the GRAT to a family member by minimizing the amount of estate and gift taxes paid. By placing the options outside the grantor's estate, the method takes advantage of the appreciation of the options in said GRAT. In one embodiment the method also maximizes the amount transferred to the family member by keeping as many of the options as possible in the GRAT until immediately prior to the termination of the GRAT, when the grantor substitutes an equivalent value of assets into the GRAT for the remaining options, and then exercises the options. The method is used for evaluation purposes in establishing the GRAT, and responds to a variety of grantor-selected options. An Irrevocable Life Insurance Trust (ILIT) may also be established to provide life insurance should the grantor die before the termination of the GRAT. If the GRAT continues until its natural termination date the ILIT will receive the assets of said GRAT and may purchase further life insurance on the grantor.

25 Claims, 5 Drawing Sheets

OTHER PUBLICATIONS

Title 26—Internal Revenue Code, Subtitle B, Chapter 14, Sec. 2702, Jan. 26, 1998.

Title 26—Internal Revenue Code, Subtitle F, Chapter 77, Sec. 7520, Jan. 26, 2000.

17 Code of Federal Regulations Ch. II (Apr. 1, 1999 Edition), § 240.16b–3 Transactions Between an Issuer and Its Officers or Directors, pp. 360–362.

Title 26—Code of Federal Regulations, vol. 12, Part 1, [Revised Apr. 1, 1999], Sec. 1.7520–1, pp. 1011–1012.

Title 26—Code of Federal Regulations, vol. 12, Part 1, [Revised Apr. 1, 1999], Sec. 1.7520–3, pp. 1013–1017.

Title 26—Code of Federal Regulations, vol. 13, Parts 2 to 29, [Revised Apr. 1, 1999], Sec. 20.7520–3, pp. 526–530.

Title 26—Code of Federal Regulations, vol. 13, Parts 2 to 29, [Revised Apr. 1, 1999], Sec. 25.2702–1, pp. 662–663.

Title 26—Code of Federal Regulations, vol. 13, Parts 2 to 29, [Revised Apr. 1, 1999], Sec. 25.2702–2, pp. 663–666.

Title 26—Code of Federal Regulations, vol. 13, Parts 2 to 29, [Revised Apr. 1, 1999], Sec. 25.2702–3, pp. 666–670.

Internal Revenue Bulletin, Revenue Rulings 98–21 and 98–34, Bulletin No. 1998–18, May 4, 1998.

Part I, Section 1274, Rev. Rul. 99–41, Oct. 1999.

National Network of Estate Planning Attorneys, Web Page for Keys to Wealth Section, Dated Oct. 15, 1999.

NumberCruncher, Estate Planning Software, Web Page Information, Dated Nov. 11, 1999.

zCalc, Tax and Estate Planning Software, Web Page Information, Dated Nov. 11, 1999.

* cited by examiner

ESTABLISHING AND MANAGING GRANTOR RETAINED ANNUITY TRUSTS FUNDED BY NONQUALIFIED STOCK OPTIONS

TECHNICAL FIELD

The present invention relates to estate planning, and more particularly, to a method for minimizing tax liability with respect to the transfer of stock options from a holder of stock options to a family member of the holder.

BACKGROUND ART

Corporations are increasingly awarding their directors and key employees nonqualified stock options, which give the recipient the right to purchase stock at a predetermined exercise price. The right to purchase the stock may begin either immediately or after the end of a vesting period, and may end after periods of, for example, five or ten years. In 1996, a change in the securities law (Rule 16b-3 of the Securities and Exchange Commission regulations) eliminated a nontransferability requirement for options in order to qualify for the exemption from insider trading under that rule. Therefore, many corporations have recently allowed nonqualified stock options to be gifted by recipients to family members or to trusts for their family members' benefit.

Income tax is incurred on the difference between the fair market value of the stock at the time of exercise of the options and the exercise price. Gift tax is incurred at the time the gift of the options is completed, and estate tax is incurred when options or the value realized from the exercise of the options held by a decedent are passed on to heirs or devisees. Estate planning is used to try to minimize the transfer tax liability on the transfer of assets from the option holder to a family member.

While known approaches to estate planning have had and will continue to have their benefits, they require substantial estate and gift taxes to be paid. For many holders of nonqualified stock options, estate and gift transfers are taxed at up to a 55% rate, and in some instances 60%, contributing to significant depletion of wealth. As the use of stock options in compensation has increased, the need for a method to address the transfer tax consequences has become more important.

DISCLOSURE OF INVENTION

The object of the present invention is to provide a means by which a holder of nonqualified stock options may transfer the value of the options to family members with minimum transfer tax liability.

According to the present invention, the holder (grantor) establishes a Grantor Retained Annuity Trust (GRAT) and transfers stock options and possibly other assets to the GRAT. The grantor retains a right to receive an annuity amount stated as a percentage of the initial transfer. The annuity payment comprises cash, stock options, or other assets. At the end of the GRAT's term, the assets of the GRAT are distributed to one or more family member beneficiaries or a trust for the family member's benefit. The taxes on the transfer of assets are minimized by (1) calculating an optimum annuity percentage to reduce the value of the taxable gift, and (2) minimizing estate taxes through use of the GRAT. The present invention also determines the length of the term of the GRAT, beginning and end of year asset value, and the form of payment of the annuity each year based on either estimated or actual input variables as selected by the user.

These and other objects, features, and advantages of the present invention will become more apparent in light of the following detailed description of a best mode embodiment thereof, as illustrated in the accompanying Drawings.

BEST MODE FOR CARRYING OUT THE INVENTION

Figure 1:
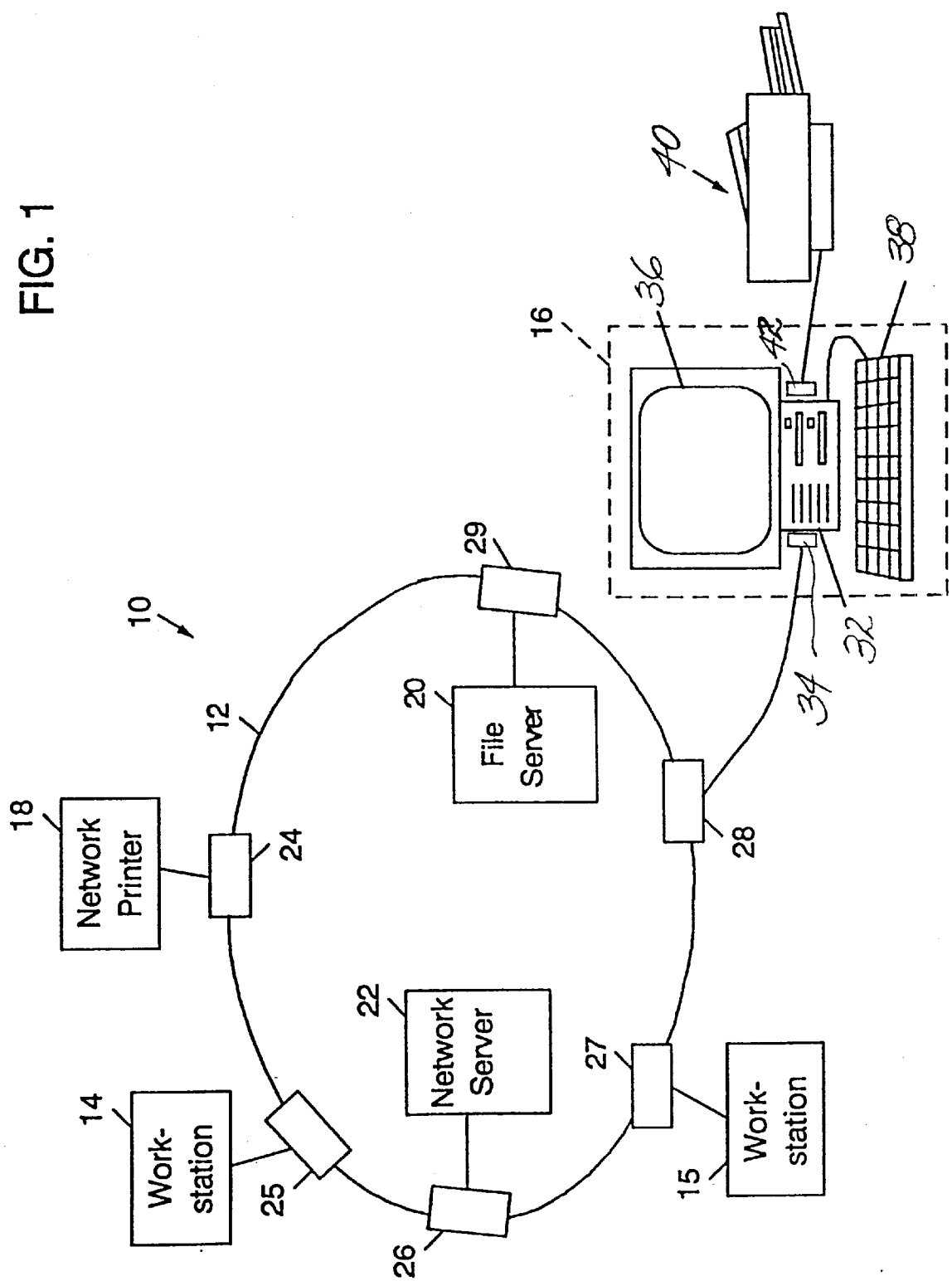
FIG. 1 is a figurative illustration of a network in which the present invention may be used.

One goal of estate planning is to minimize the gift and estate taxes incurred on the transfer of wealth within a family from one generation to the next. Irrevocable trusts are frequently used for this purpose, with the creator (grantor) of the trust naming beneficiaries who will receive the assets of the trust at its termination. A GRAT is a special type of irrevocable trust under which the grantor transfers assets to the trust and is paid a term annuity from the trust. At the end of the GRAT term any remaining assets are distributed to the named beneficiaries.

The present invention is a method for estate planning that transfers wealth by funding a GRAT with nonqualified stock options, and cash if desired. This type of GRAT is also referred to as a SOGRAT™[1] (Stock Option Grantor Retained Annuity Trust). The method combines known approaches to the wealth transfer techniques of GRATs and stock options in a novel way.

[1]SOGRAT is a trademark of The Wealth Transfer Group Inc., and an application for registration of the mark has been submitted to the U.S. Patent and Trademark Office.

Under the Internal Revenue Code, a GRAT is a trust in which the grantor retains a qualified annuity interest. As specified in Treasury Regulation §25.2702-2(a)(6), a qualified annuity interest is any interest that consists of the right to receive fixed amounts not less frequently than annually. Herein, an annuity is a payment made not less frequently than annually. To conform with Treasury Regulation §25.2702-3(b) and (d), a GRAT must meet several requirements including but not limited to (1) the interest retained by the grantor must be an irrevocable right to receive a fixed annuity amount, which may exceed the prior year's annuity amount by up to twenty percent, (2) the governing instrument of the trust must prohibit additional contributions to the trust, (3) the governing instrument must prohibit distributions to anyone other than the grantor for its term, and (4) the governing instrument must fix the term of the GRAT, which can be a term of years or for the life of the grantor, or for the shorter of those periods. The GRAT term should be at least two years and can be as long as the grantor chooses.

When any assets, including stock options, are transferred to a GRAT a percentage of the original value of the assets in the GRAT must be selected for the annuity to the grantor. The grantor is responsible for paying any gift tax due. The gift tax is based on the value of the gift, which is calculated from the original value of the GRAT assets less the present value of the annuity payments, and including a mortality factor. As stated in Internal Revenue Code Sec. 7520(a)(2), the interest rate used in calculating the gift value is 120% of the federal midterm rate for the month in which the transfer falls, in effect under Code Sec. 1274(d)(1). At the end of the GRAT's term the remaining assets in the GRAT, in this case, stock options or other GRAT assets, go to the beneficiaries of the GRAT, who are the grantor's selected family members or a trust for their benefit (for discussion purposes herein the text will refer to the children). In the preferred embodiment, at the end of the last year of the GRAT's term the grantor substitutes cash into the GRAT in place of the assets remaining in the GRAT. The GRAT will have full benefit of the appreciation of the options that occurred within the GRAT.

In a best mode embodiment of the present invention, the steps of the method are encoded in a software program which may be adapted for execution on any one of a variety of known type signal processing devices in any one of a number of different operating system protocols. Depending on the size of a financial service, there may be one or more professionals providing financial services to one or more clients simultaneously. Therefore the software is equally adapted for installation and use in a standalone signal processor, or for installation in a file server environment for local network applications. In a best mode, the software program for the invention may be used in Microsoft Excel[2] software, is programmed in Visual Basic 6[3] or a similar program, and operates on a WINDOWS 95[4] or higher operating system. For network installations the operating system is WINDOWS NT[5] or higher with Microsoft Excel installed in each workstation performing the invention. The minimum workstation (PC) RAM memory is 4 MB, and 8 MB is preferred. Also the preferred PC peripherals are a hard disk and a CD ROM drive. The software program may be stored on a network server or hard drive, or on a portable storage medium such as diskettes, CD ROM, tape drive, or any other such storage medium known by those skilled in the art to be suitable for such purposes.

[2]Microsoft Excel is a registered trademark of the Microsoft Corporation.
[3]Visual Basic 6 is a registered trademark of the Microsoft Corporation.
[4]WINDOWS 95 is a registered trademark of the Microsoft Corporation.
[5]WINDOWS NT is a registered trademark of the Microsoft Corporation.

FIG. 1 is a figurative schematic illustration of such a local area network (LAN) 10 in which a landline 12, or other type communications medium, interconnects several workstations 14–16, a network printer 18, a file server 20, and a network server 22; each connected to the network medium through network interface cards (NICs) 24–29. The network may have any one of a number of known network topologies. The networked devices communicate with each other in the signal protocol established by the network operating system software, which is installed in the network server 22.

Each of the workstations, as shown by the workstation 16, include a computer based signal processor 32 connected through a communication port 34 to the network through NIC 28, thereby allowing the work station 16 to communicate with the other network connected workstations 14, 15, the network printer 18, the file server 20, and the network server 22. The workstation 16 further includes a user/operator viewable display 36 and an operator responsive input signaling device 38. The input signaling device is of a known type, such as a keyboard, mouse, or any other known type input signaling device which may be considered suitable by those skilled in the art for use in the operation of the invention. Preferably, the workstation 16 includes a local printer 40, which is connected to a printer port 42 of the signal processor 32. For purposes of the present invention the printer may be any one of the various known types of print imaging devices.

Figure 2:
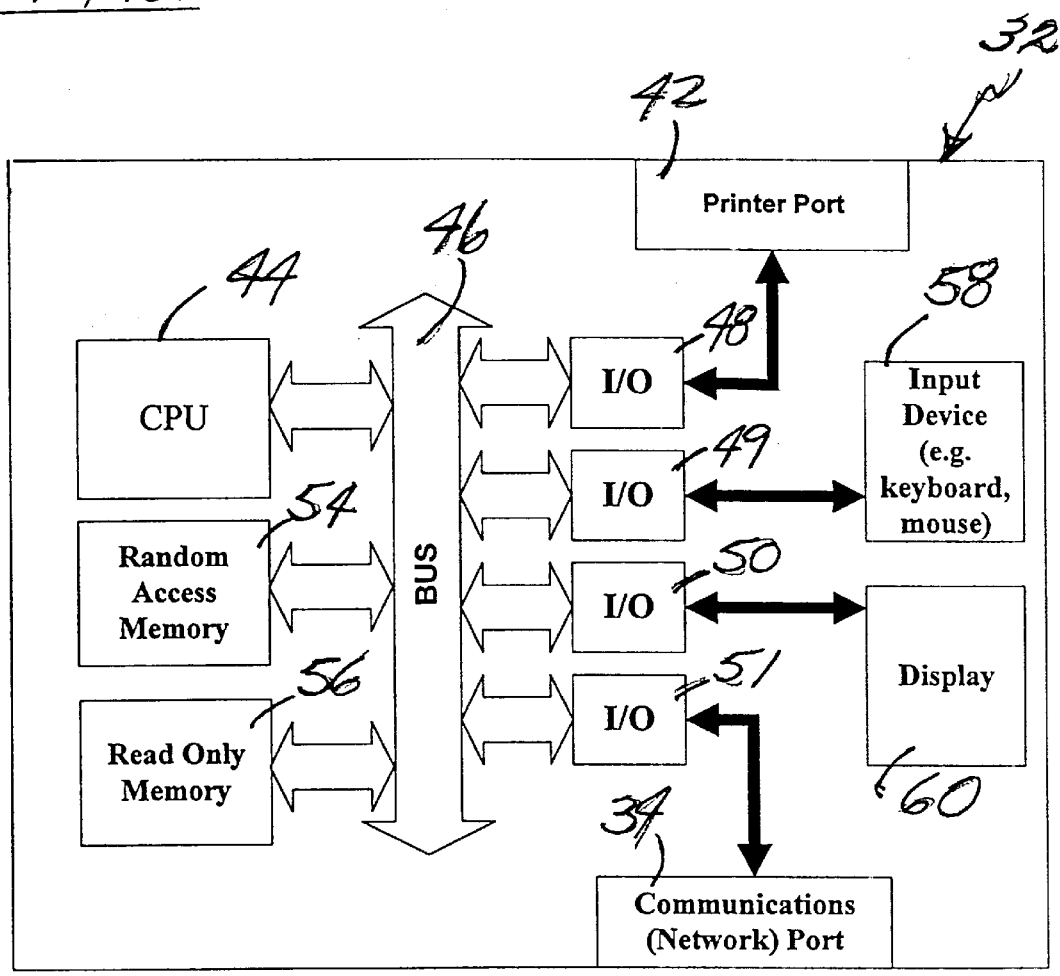
FIG. 2 is a block diagram illustration of one of the functional elements of the embodiment of FIG. 1.

FIG. 2 is a simplified schematic diagram of the signal processor 32, which includes a central processing unit (CPU) 44 connected through a Universal Signal Bus (USB) 46 to a plurality of input/output (I/O) devices 48–51, to a volatile random access signal memory (RAM) 54, and a non-volatile read only memory (ROM) 56. The I/O devices 48–51 connect the CPU 44 to the signal processor's printer port 42, the input signaling device port 58, the display port 60, and the communications port 34.

Figure 3:
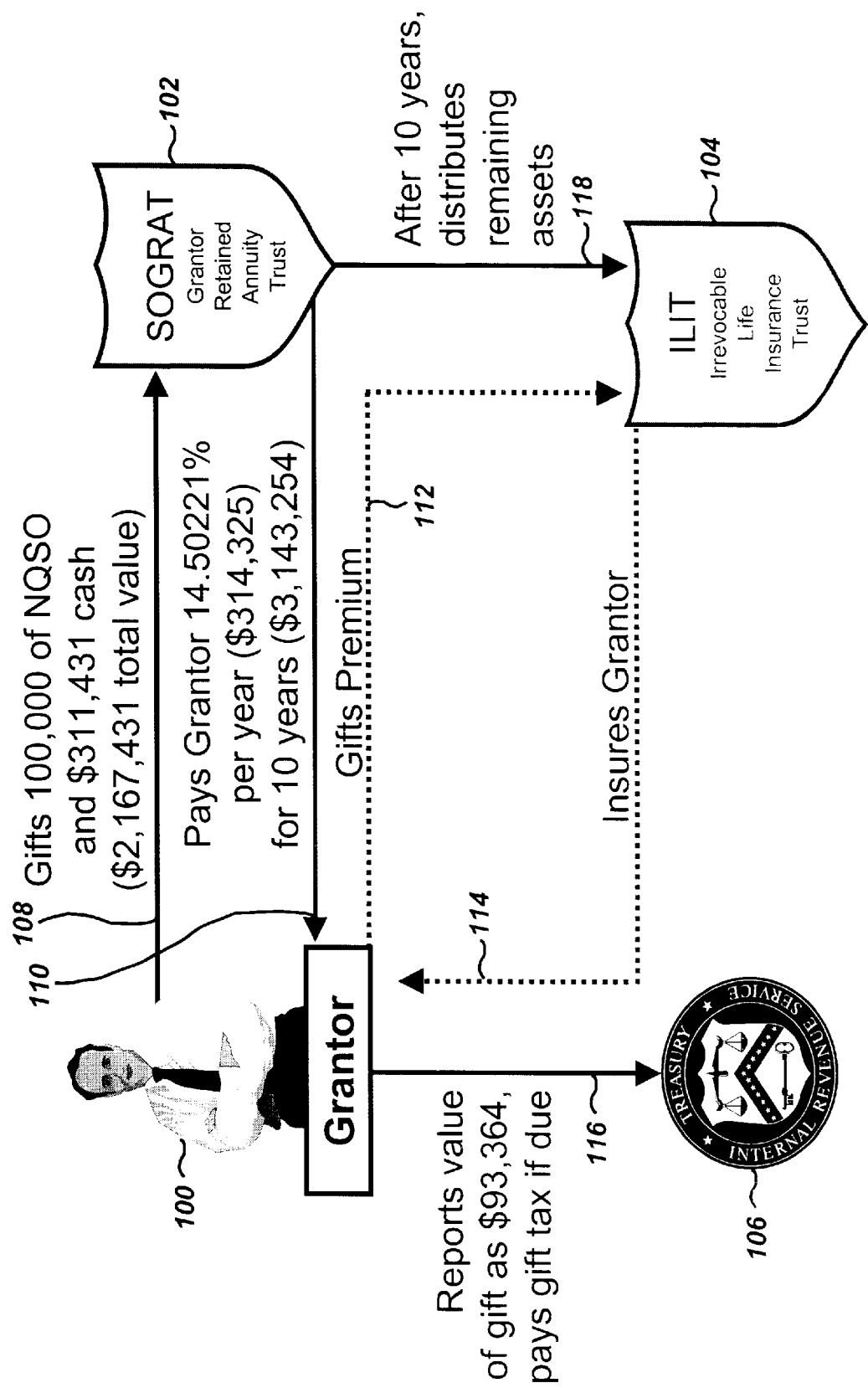
FIG. 3 is a figurative illustration of the elements included in an exemplary performance of the invention.

FIG. 3 is an exemplary illustration of the present invention. First, not shown in FIG. 3, the stock options are valued using the Black-Scholes model endorsed in IRS Revenue Procedure 98-34. Other models may be used so long as the option value is based on (1) the option's exercise price, (2) the underlying stock's current price, (3) the underlying stock's expected volatility, (4) the underlying stock's expected dividend yield, (5) the risk-free interest rate over the remaining term of the option, and (6) the option's expected life. The exercise price is in the recipient's stock option contract, and the stock's current price is readily available. Volatility is the measure of the tendency of a stock price to change, and under the Statement of Financial Accounting Standards No. 123 is required: to be disclosed in the company's financial statements, as is item (4), the stock's expected dividend yield. The dividend yield is the expected dividend payment divided by the stock's average price. Item (5), the risk-free interest rate is published in the financial section of most business publications and is the yield on a zero-coupon Treasury bond with a remaining term equal to the option's remaining life. The last item, the option's expected life, is to be calculated by one of two methods, either the "maximum remaining term" or the "computed expected life," also set forth in Revenue Procedure 98-34. Assumed data is provided in Table 1 hereinbelow.

In the example shown in FIG. 3, the grantor 100 transfers $311,431 in cash and 100,000 nonqualified stock options 108 to a ten-year GRAT 102. The cash is included to be used to pay the annuity in case the value of the options decreases, in order to keep the options in the GRAT 102 for as long as possible. The annuity amount is fixed and will require more options to reach that fixed amount if the options have decreased in value. The optimum annuity 110 is that which results in the lowest possible gift, and is determined by calculating an annuity payment that will as closely as possible equal on a present value basis the principal contributed to the GRAT. The calculation complies with IRS Revenue Ruling 77-454 and various regulations, including Treasury Reg. §25.7520-3(b)(2)(v) Example 5. Computer software applications are available that perform this calculation, such as NumberCruncher by Leimberg & LeClair, Inc., of Bryn Mawr, Pa. and zCalc by Lexcite Development, LLC of Arlington Heights, Ill. The optimum annuity percentage in the example in FIG. 3 is 14.50221% of the assets transferred to the GRAT 102, or $314,325. The cash will be paid out of the GRAT 102 first, allowing the options to have more time to appreciate, the goal being to maximize the number of options left in the GRAT at the end of the GRAT term. The gift is valued at $93,364 based on the value of the assets transferred to the GRAT less the present value of the annuity and a mortality component. The grantor 100 must pay at a rate of up to 60% of the gift value as the gift tax 116 to the IRS 106 in an amount as high as $56,018.

TABLE 1

Assumptions

| | |
|---|---|
| Executive or Director Recipient of Options | Age 55 |
| Income Tax Bracket | 40% |
| Estate Value | $20,000,000 |
| Estate Tax Bracket | 55% |
| Prior Taxable Gifts | $3,000,000 |
| Marginal Gift Tax Bracket | 55% |
| Stock Price at time of Grant Date | $50.00 |
| Exercise Price | $50.00 |
| Stock Volatility (trailing 60 months) | 20% |
| Expected Dividend | 1.5% |
| Risk Free Interest Rate | 6% |
| Options' Expected Life | 10 Years |
| Stock Appreciation | 15% per Year |

Over a ten-year term for the GRAT 102, assuming appreciation of the value of the stock of 15% and 4% on the cash, the grantor 100 will have received $3,143,254 of value. The composition of the annuity each year is shown in Table 2.

TABLE 2

| Year | Cash Paid | Options Paid |
|---|---|---|
| 1 | $314,325.44 | 0 |
| 2 | $8,947.22 | 10,451 |
| 3 | $21.32 | 8,604 |
| 4 | $33.38 | 6,906 |
| 5 | $11.08 | 5,569 |
| 6 | $15.62 | 4,514 |
| 7 | $4.85 | 3,681 |
| 8 | $3.84 | 3,020 |
| 9 | $112.34 | 2,490 |
| 10 | $19.52 | 2,064 |

In this example, most of the cash is paid out first. Here, the cash from year two is the earned interest on the gifted cash. The "options paid" quantity is calculated each year based on the value of the options that year, and always yields the value approximately required to pay the annuity 110. Options must be paid in the annuity in whole numbers; a fraction of an option cannot be paid. Because it is unlikely that the number of options to be paid will exactly equal the required annuity amount, a small amount of cash is retained in order to supplement the options to meet the required annuity payment each year. In addition, there will be 52,701 options remaining in the GRAT 102 at the end of the term, with a total value of $8,025,308, plus $1,118 remaining in cash for a total GRAT value of $8,026,426. Prior to the end of the GRAT, the grantor 100 substitutes in an equivalent value of cash. The grantor then exercises the accumulated stock options and sells all shares to cover taxes and the cash substitution. Dollar figures are rounded to the nearest thousand hereinafter. He exercises the 100,000 options and receives 100,000 shares of stock having a value of $20,228,000. His exercise price is $50 per share for a total cost of $5,000,000, leaving him with taxable income of $15,228,000. Assuming an immediate total liquidation of all stock received from the award of the options the grantor receives $15,228,000 in cash payment. At a 40% income tax rate, the grantor 100 pays income tax on the $15,228,000 difference for a tax of $6,091,000 and has a total of $9,137,000 in after-tax cash received by exercising the options. Subtracting the $8,025,000 he substituted into the GRAT from the cash received he nets $1,112,000.

In the basic embodiment of the present invention, the GRAT 102 will then distribute its remaining assets to the grantor's children. In the best mode, shown in FIG. 3, the GRAT 102 will instead distribute the assets to an Irrevocable Life Insurance Trust (ILIT) 104. The ILIT 104 is ideally set up when the GRAT 102 is started, funded 112 with gifts from the grantor 100. The purpose of the ILIT 104 is to provide a life insurance policy insuring 114 the grantor 100 that can cover the estate taxes if the grantor 100 dies before the natural expiration of the GRAT 102, whereupon all the assets of the GRAT 102 go to the grantor's estate, depending on the terms of the GRAT. The policy has the ILIT 104 as its named beneficiary, and the children are the ultimate beneficiaries of the ILIT. In addition, if the grantor 100 lives to the end of the term of the GRAT 102, the assets distributed to the ILIT 104 would be available to be used to purchase additional life insurance, for a split dollar rollout, or continued premium payment. Split dollar agreements most frequently occur in the employer/employee context, often with the employer corporation paying most of an insurance premium and the employee paying the remainder. If the employee wishes to acquire the policy in full, the employee must reimburse the corporation for all premiums advanced by the corporation. This is referred to as a rollout. The funds for the rollout could come from the GRAT assets that are distributed to the ILIT. Also, the proceeds of the life insurance could be used to buy assets from, the estate upon the death of the grantor 100 as a means to get cash into the estate to pay the estate taxes (it is not tax efficient for the ILIT to pay the estate taxes directly).

Figure 4A:
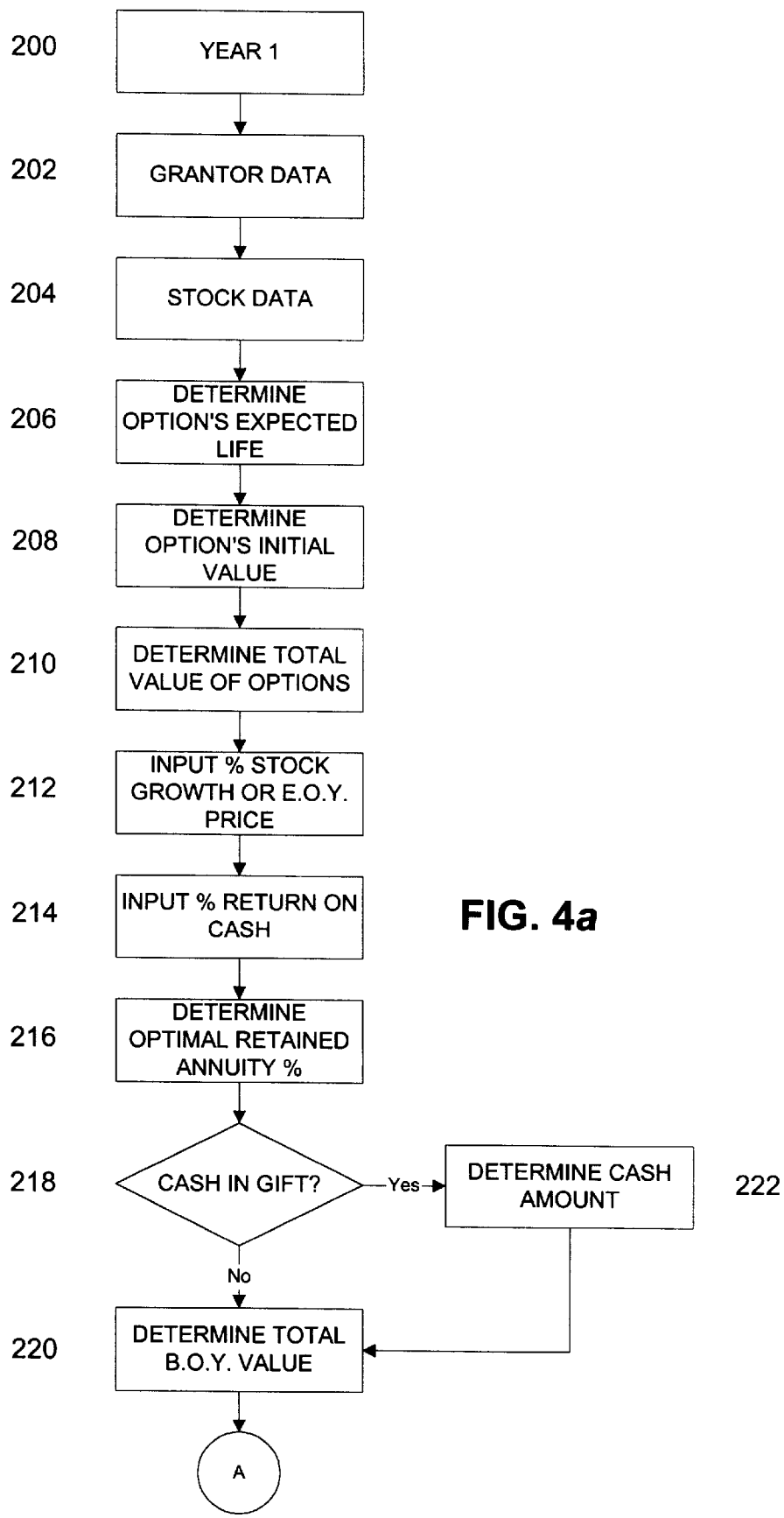
FIGS. 4a and 4b are a flow chart diagram of a preferred embodiment of the present invention.
Figure 4B:
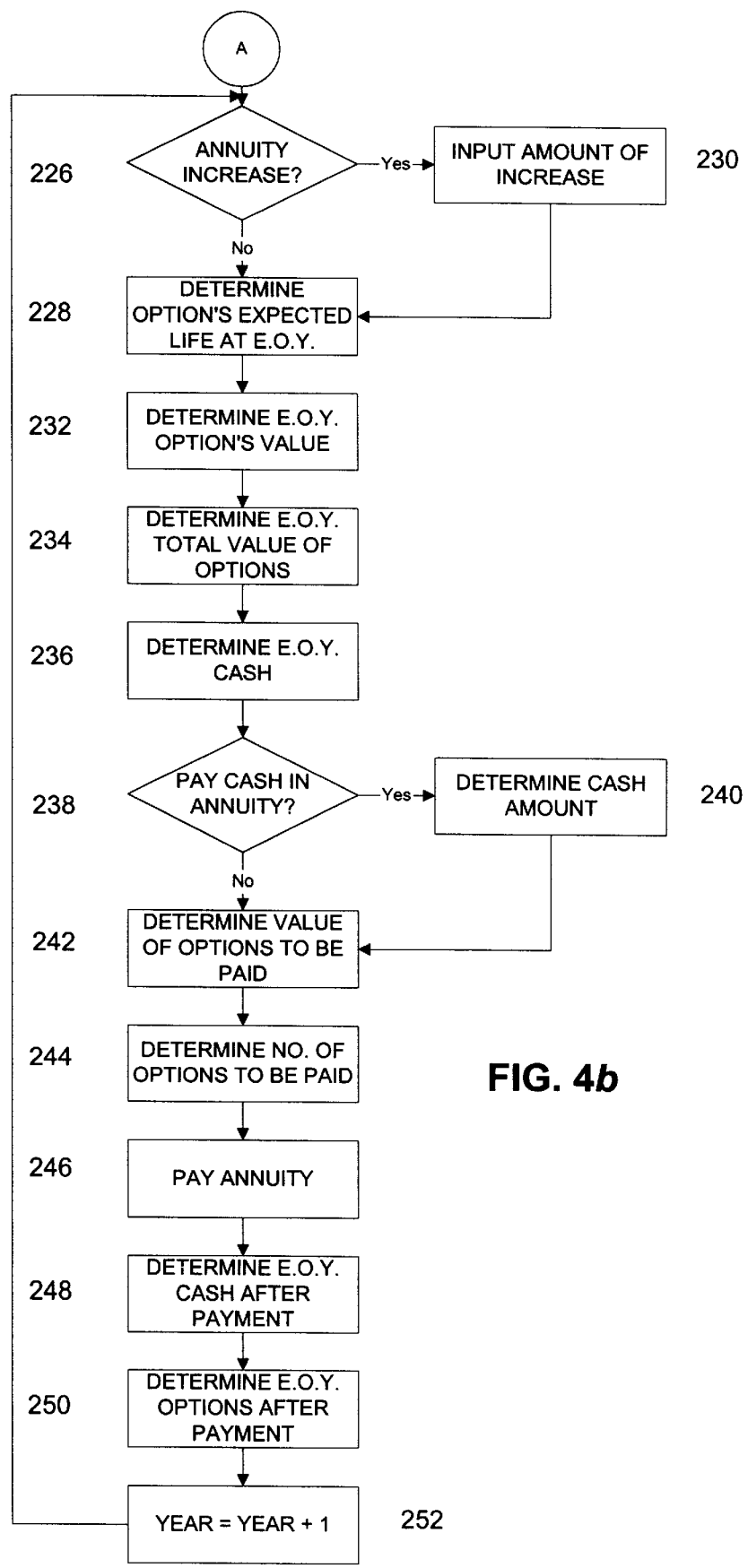

FIGS. 4a and 4b are a flow chart depicting the decision-making process for establishing the GRAT funded by non-qualified stock options. A portion of the chart is also used to manage the assets of the GRAT during its term. When the GRAT is established at the beginning of year one 200, grantor data 202 is input. Grantor data 202 on the grantor includes age, highest income tax bracket, estate value, and estate and gift tax bracket. Stock data 204 includes the number of options granted, the stock price at the grant date, the exercise price of the options, the stock volatility and expected dividend yield as listed in the company's financial statements, and the risk free interest rate. From the grantor data 202 and stock data 204 the option's expected life 206, initial value 208, and total value 210 may be calculated. As previously discussed, the option's expected life 206 is calculated using one of two methods included in IRS Revenue Procedure 98-34, either the "maximum remaining term" or the "computed expected life." The option's value 208 is determined using a model such as the Black-Scholes model, also endorsed in IRS Revenue Procedure 98-34. The total value of the options 210 is the number of options multiplied by the initial value of the options 208.

Additional data provided by the grantor includes the estimated stock growth or estimated end of year stock price 212 over the life of the GRAT and the estimated return on cash investment 214. A retained annuity percentage is calculated to minimize the valuation of the gift to the GRAT. In accordance with IRS Code Section 7520, the gift is valued as the total value of the assets originally placed in the GRAT less the present value of the annuity payments, factoring in a mortality component.

The grantor must decide if cash is to be included 218 in the initial transfer. The benefit of cash in the transfer is that if the options do not appreciate in the first year or more of the GRAT, the cash will be used to pay the annuity instead of depleting the options from the GRAT. The options will stay in the GRAT longer than they would otherwise, giving them the opportunity to appreciate. The amount of cash in the transfer is determined 222 as an amount equal to one annuity payment on a present value basis with the interest rate being the assumed rate of return on cash. The beginning of year value 220 is the total of the options' value 210 plus the cash in the transfer 222.

The annuity is allowed to increase each year 226. The amount of the increase is limited to 20% of the prior year's annuity, and must be set prior to the start of the GRAT. The amount of increase 230 is determined by the grantor's preference. In year one, and possibly all years, there will be no increase. Next, the option's expected life at the end of year one is one year less than the initial option's life 208. The end of year option value 228 is calculated using estimated stock data 204. The end of year total option value 234 is determined by multiplying the number of options times the option value 228. The end of year cash 236 is determined based on the estimated interest rate.

A decision 238 is required whether or not to pay cash or other GRAT assets other than options in the annuity. As previously discussed, it is preferable to pay cash or other assets first in order to give the options additional time to appreciate, with the goal being to leave to greatest number of options in the GRAT as possible at the end of the GRAT's term. In the preferred embodiment, the amount of cash to be included in the annuity is therefore determined 240 by paying as much of the first annuity with cash as possible. Deducting that amount from the annuity results in the value of the options to be paid 242, from which the number of options to be paid 244 can be readily determined by dividing by the end of year option's value 232. The annuity is then "paid" 246, or in other words subtracted from the value of the assets in the GRAT in order to calculate the estimated end of year value of the GRAT. The end of year cash after payment 248 and end of year options after payment 250 of the annuity are then found by subtraction. The end of year cash after payment 248 and end of year options after payment 250 become the beginning of year values for year two, and the process repeats, starting with deciding if the annuity increases 226, and continuing through the end of the GRAT. This will result in an estimate that shows most of the cash and some of the options returned through the annuity to the grantor, and some of the options still in the GRAT. The goal is to maximize the options left in the GRAT at its end. The terms of the GRAT allow the grantor to substitute assets of equivalent value, most likely cash, into the GRAT immediately prior to the GRAT's termination. The method of the present invention has allowed the grantor to have an estimate of the transactions that will occur over the life of the GRAT.

The present invention is also useful to manage the GRAT throughout its term. Starting with choosing if the annuity will increase 226, each of the values is recalculated each year using actual rather than estimated data.

Although the invention has been shown and described with respect to a best mode embodiment thereof, it should be understood by those skilled in the art that various changes, omissions, and additions may be made to the form and detail of the disclosed embodiment without departing from the spirit and scope of the invention, as recited in the following claims.

What is claimed is:

1. A method for minimizing transfer tax liability of a grantor for the transfer of the value of nonqualified stock options to a family member grantee, the stock options having a stated exercise price and a stated period of exercise, the method performed at least in part within a signal processing device and comprising:

establishing a Grantor Retained Annuity Trust (GRAT);

funding said GRAT with assets comprising stock options, the stock options having a determined value at the time the transfer is made;

setting a term for said GRAT and a schedule and amount of annuity payments to be made from said GRAT; and performing a valuation of the stock options as each annuity payment is made and determining the number of stock options to include in the annuity payment.

2. The method of claim 1 wherein the amount of the annuity is set by determining an optimum percentage of said GRAT assets that will be said annuity with the purpose of reducing the taxable gift value.

3. The method of claim 1 wherein the step of funding includes contributing supplemental assets in addition to the stock options.

4. The method of claim 3 wherein said supplemental assets comprise an amount of cash.

5. The method of claim 4 wherein the amount of cash to be included in said transfer to said GRAT is equal to at least the first year's annuity, whereby the cash may be used to defer the payment of said options in said annuity by including some or all of said cash in at least one annuity payment, thereby reducing the number of said options required to be paid as part of said annuity, and increasing the number of said options remaining in said GRAT.

6. The method of claim 5 wherein the amount of cash comprises an additional amount of cash at least equal to the total of the end of year evaluated option values for one option for each year in the life of the GRAT, whereby said additional amount of cash may be used to pay the difference each year between the required annuity payment and the value of the options included in the annuity payment.

7. The method of claim 4 wherein the amount of cash to be included in said transfer to said GRAT is equal to at least the first year's annuity on an estimated present value basis assuming a rate of return on the cash in said GRAT, whereby the cash may be used to defer the payment of said options in said annuity by including some or all of said cash in at least one annuity payment, thereby reducing the number of said options required to be paid as part of said annuity, and increasing the number of said options remaining in said GRAT.

8. The method of claim 7 wherein the amount of cash comprises an additional amount of cash at least equal to the total of the end of year evaluated option values for one option for each year in the life of the GRAT, whereby said additional amount of cash may be used to pay the difference each year between the required annuity payment and the value of the options included in the annuity payment.

9. The method of claim 3 wherein said supplemental assets comprise an amount of stock.

10. The method of claim 1 further comprising the step of removing some or all of the stock options from said GRAT and substituting into said GRAT assets of equivalent value.

11. The method of claim 10 wherein the step of removing some or all of the stock options and substituting into said GRAT assets of equivalent value is performed following the final annuity payment but prior to the termination of said GRAT.

12. The method of claim 1 further comprising the step of determining the term of said GRAT depending on the grantor's life expectancy and the nonqualified stock option life expectancy.

13. A method for minimizing transfer tax liability of a grantor for the transfer of the value of nonqualified stock options to a family member grantee, the stock options having a stated exercise price and a stated period of exercise, the method performed at least in part within a signal processing device and comprising:

establishing a Grantor Retained Annuity Trust (GRAT);

funding said GRAT with assets comprising stock options, the stock options having a determined value at the time the transfer is made;

setting a term for said GRAT and a schedule and amount of annuity payments to be made from said GRAT;

performing a valuation of the stock options as each annuity payment is made and determining the number of stock options to include in the annuity payment; and establishing an Irrevocable Life Insurance Trust (ILIT) that provides a life insurance policy on the grantor with the family member grantees as named beneficiaries, said ILIT to receive said assets of said GRAT on said GRAT's natural termination.

14. The method of claim 13 wherein the amount of the annuity is set by determining an optimum percentage of said GRAT assets that will be said annuity with the purpose of reducing the taxable gift value.

15. The method of claim 13 wherein the step of funding includes contributing supplemental assets in addition to the stock options.

16. The method of claim 15 wherein 'said supplemental assets comprise an amount of cash.

17. The method of claim 16 wherein the amount of cash to be included in said transfer to said GRAT is equal to at least the first year's annuity, whereby the cash may be used to defer the payment of said options in said annuity by including some or all of said cash in at least one annuity payment, thereby reducing the number of said options required to be paid as part of said annuity, and increasing the number of said options remaining in said GRAT.

18. The method of claim 17 wherein the amount of cash comprises an additional amount of cash at least equal to the total of the end of year evaluated option values for one option for each year in the life of the GRAT, whereby said additional amount of cash may be used to pay the difference each year between the required annuity payment and the value of the options included in the annuity payment.

19. The method of claim 16 wherein the amount of cash to be included in said transfer to said GRAT is equal to at least the first year's annuity on an estimated present value basis assuming a rate of return on the cash in said GRAT, whereby the cash may be used to defer the payment of said options in said annuity by including some or all of said cash in at least one annuity payment, thereby reducing the number of said options required to be paid as part of said annuity, and increasing the number of said options remaining in said GRAT.

20. The method of claim 19 wherein the amount of cash comprises an additional amount of cash at least equal to the total of the end of year evaluated option values for one option for each year in the life of the GRAT, whereby said additional amount of cash may be used to pay the difference each year between the required annuity payment and the value of the options included in the annuity payment.

21. The method of claim 15 wherein said supplemental assets comprise an amount of stock.

22. The method of claim 13 further comprising the step of removing some or all of the stock options from said GRAT and substituting into said GRAT assets of equivalent value.

23. The method of claim 22 wherein the step of removing some or all of the stock options and substituting into said GRAT assets of equivalent value is performed following the final annuity payment but prior to the termination of said GRAT.

24. The method of claim 13 wherein said ILIT is established at the time said GRAT is established.

25. A method for minimizing transfer tax liability of a grantor for the transfer of the value of nonqualified stock options to a family member grantee, the stock options having a stated exercise price and a stated period of exercise, the method performed at least in part within a signal processing device and comprising:

establishing a Grantor Retained Annuity Trust (GRAT);

funding said GRAT with assets comprising stock options, the stock options having a determined value at the time the transfer is made;

setting a term for said GRAT and a schedule and amount of annuity payments to be made from said GRAT;

performing a valuation of the stock options as each annuity payment is made and determining the number of stock options to include in the annuity payment;

determining an optimum percentage of said GRAT assets that will be said annuity with the purpose of reducing the taxable gift value;

including an amount of cash in said transfer to said GRAT at least equal to the first year's annuity on an estimated present value basis assuming a rate of return on said amount of cash in said GRAT;

deferring the payment of said options in said annuity by including some or all of said cash in at least one annuity payment, thereby reducing the number of said options required to be paid as part of said annuity, and increasing the number of said options remaining in said GRAT; and establishing at the time said GRAT is established an Irrevocable Life Insurance Trust (ILIT) that provides a life insurance policy on said grantor with said family member grantees as named beneficiaries, said ILIT to receive said assets of said GRAT on said GRAT's natural termination.

\* \* \* \* \*

UNITED STATES PATENT AND TRADEMARK OFFICE
CERTIFICATE OF CORRECTION

PATENT NO.   : 6,567,790 B1                                                Page 1 of 1
DATED        : May 20, 2003
INVENTOR(S)  : Slane, Robert C.

It is certified that error appears in the above-identified patent and that said Letters Patent is hereby corrected as shown below:

Column 9,
Lines 15-16, delete the phrase "with the family member grantees as named benficiaries" and insert in place thereof -- said life insurance policy having the ILIT as named beneficiary, said ILIT having the family member grantee as named beneficiary, and --.

Column 10,
Lines 38-40, delete the phrase "at least equal to the first year's annuity on an estimated present value basis assuming a rate of return on said amount of cash in said GRAT";
Lines 49-50, delete the phrase "said grantor with said family member grantees as named beneficiaries,"and insert in place thereof -- the grantor said life insurance policy having the ILIT as named beneficiary, said ILIT having the family member grantee as named beneficiary, and --.

Signed and Sealed this

Twenty-third Day of September, 2003

JAMES E. ROGAN
*Director of the United States Patent and Trademark Office*

%PDF start

(12) EX PARTE REEXAMINATION CERTIFICATE (10458th)
United States Patent
Slane

(10) Number: US 6,567,790 C1
(45) Certificate Issued: Dec. 30, 2014

(54) ESTABLISHING AND MANAGING GRANTOR RETAINED ANNUITY TRUSTS FUNDED BY NONQUALIFIED STOCK OPTIONS

(75) Inventor: Robert C. Slane, Maitland, FL (US)

(73) Assignee: Wealth Transfer Group, L.L.C., Altamonte Springs, FL (US)

Reexamination Request:
No. 90/009,868, Jan. 12, 2011

Reexamination Certificate for:
| | |
|---|---|
| Patent No.: | 6,567,790 |
| Issued: | May 20, 2003 |
| Appl. No.: | 09/453,364 |
| Filed: | Dec. 1, 1999 |

Certificate of Correction issued Sep. 23, 2003

(51) Int. Cl.
*G06Q 40/00* (2012.01)
*G06Q 40/04* (2012.01)

(52) U.S. Cl.
USPC .......................................... 705/36 T; 705/35

(58) Field of Classification Search
None
See application file for complete search history.

(56) References Cited

To view the complete listing of prior art documents cited during the proceeding for Reexamination Control Number 90/009,868, please refer to the USPTO's public Patent Application Information Retrieval (PAIR) system under the Display References tab.

*Primary Examiner* — Sam Rimell

(57) ABSTRACT

An estate planning method for minimizing transfer tax liability with respect to the transfer of the value of stock options from a holder of stock options to a family member of the holder. The method comprises establishing a Grantor Retained Annuity Trust (GRAT) funded with nonqualified stock options. The method maximizes the transfer of wealth from the grantor of the GRAT to a family member by minimizing the amount of estate and gift taxes paid. By placing the options outside the grantor's estate, the method takes advantage of the appreciation of the options in said GRAT. In one embodiment the method also maximizes the amount transferred to the family member by keeping as many of the options as possible in the GRAT until immediately prior to the termination of the GRAT, when the grantor substitutes an equivalent value of assets into the GRAT for the remaining options, and then exercises the options. The method is used for evaluation purposes in establishing the GRAT, and responds to a variety of grantor-selected options. An Irrevocable Life Insurance Trust (ILIT) may also be established to provide life insurance should the grantor die before the termination of the GRAT. If the GRAT continues until its natural termination date the ILIT will receive the assets of said GRAT and may purchase further life insurance on the grantor.

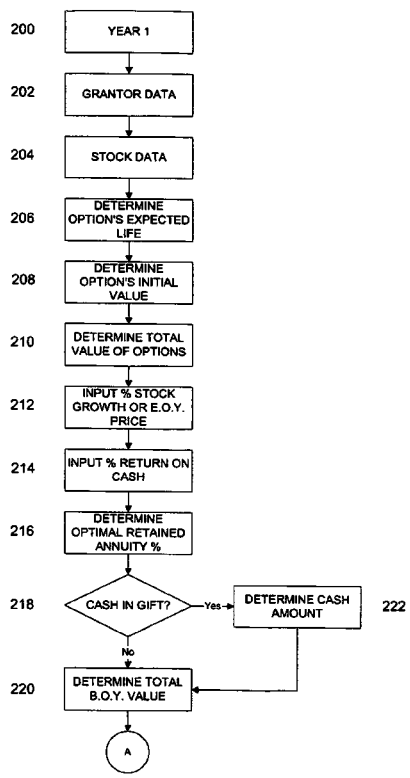
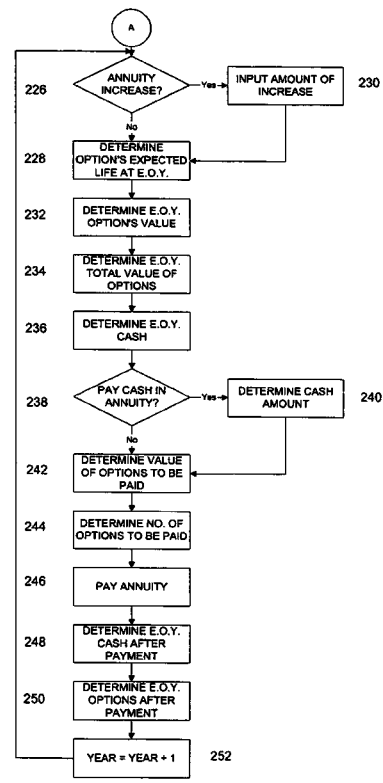

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-25 are cancelled.

* * * * *